United States Patent [19]

Gadd

[11] Patent Number: 6,052,108
[45] Date of Patent: Apr. 18, 2000

[54] METHOD OF DISPLAYING TEXT HAVING IMPROVED USEABILITY

[75] Inventor: Richard John Gadd, Eastleigh, United Kingdom

[73] Assignee: International Business Machines Corporation, Armonk, N.Y.

[21] Appl. No.: 08/280,271

[22] Filed: Jul. 26, 1994

[30] Foreign Application Priority Data

Mar. 10, 1994 [GB] United Kingdom .................... 9404647

[51] Int. Cl.[7] ...................................................... G09G 5/22
[52] U.S. Cl. ............................ 345/141; 345/124; 395/791
[58] Field of Search ..................................... 345/141, 145, 345/123, 124, 146, 341, 357; 359/155, 156, 157; 395/791, 793

[56] References Cited

U.S. PATENT DOCUMENTS

| 4,794,386 | 12/1988 | Bedrij et al. | 345/123 |
| 4,922,448 | 5/1990 | Kunieda et al. | 345/141 |
| 4,962,475 | 10/1990 | Hernandez et al. | 345/123 |
| 5,038,138 | 8/1991 | Akiyama et al. | 345/123 |
| 5,142,669 | 8/1992 | Inoue et al. | 395/157 |
| 5,157,763 | 10/1992 | Peter et al. | 345/145 |
| 5,204,947 | 4/1993 | Bernstein et al. | 345/146 |
| 5,297,249 | 3/1994 | Bernstein et al. | 395/156 |
| 5,303,361 | 4/1994 | Colwell et al. | 395/425 |
| 5,339,391 | 8/1994 | Wroblewski et al. | 395/157 |

OTHER PUBLICATIONS

APS Text Search & Retrieval, Jun. 1989.

*Primary Examiner*—Amare Mengistu
*Attorney, Agent, or Firm*—Edward H. Duffield; Andrew J. Dillon

[57] ABSTRACT

A method of displaying text having improved useability is described which overcomes the difficulty of losing eye contact with an occurrence of a word in a line of text as the display is changed from one of disparate lines in one or more files to a new view of a single one of those disparate lines shown in context with the lines surrounding it in the file displayed above and below the selected occurrence. The display of the surrounding text in this way gives the illusion that the surrounding lines in the file were "filled-in" around the chosen line, such that the eye of the user does not have to move and re-locate the text of interest, since the text has not moved on the physical display screen.

5 Claims, 2 Drawing Sheets

METHOD OF DISPLAYING TEXT HAVING IMPROVED USEABILITY

BACKGROUND OF THE INVENTION

1. Technical Field

The present invention relates to a method of displaying text in its context on a display screen and more particularly to a method which maintains eye contact with a line of text as the display is changed to show the line in its context.

2. Description of the Related Art

Cross reference tools are used to search input data, which is primarily Assembler, Cobol or C source code, but may also be non-code data, such as text files. The input data, which can be a single file or multiple files, is searched for occurrences of a word in that input data and all lines of characters in the input data containing the word are displayed together with the file in which they were found. A user may select a specific line containing the word and have that line displayed in context, that is shown with the text immediately before and after the line containing the word. The user may return to the display of all lines of the input data containing the word and select another line containing the word and have that line displayed in context.

Conventionally, the selection of the input data and the specification of the word to be searched for is completed on a first screen, or in a first window. The lines of the input data containing the word are displayed together with the name of the file in which they were found on a second screen or in a second window. When a specific line is selected, the line is displayed in its context on a third screen or in a third window. In this way a user moves through the screens or the windows as he moves from specifying a word to look for to where he looks at a specific line containing the word in its context.

The movement from screen to screen or from window to window means that the specific line of input data selected must be located when it is displayed in its context. Conventionally, this is achieved by using highlighting of the specific line or by using color to differentiate the specific line. The user then locates the specific line on the screen or in the window by looking for a highlighted line or by looking for the color used to denote the specific line.

The viewing of specific lines containing the selected word is repeated many times during any particular usage of a cross-reference tool. The need to locate the specific line each time a different occurrence is viewed can be tiring and disrupt the thought process of the user. In addition it can sometimes be difficult to locate the occurrence when it is displayed in its context.

So it would be advantageous if the disruption of the thought process, the tiredness caused by the user's eye locating the specific lines and the lower productivity because of the need to locate an occurrence on a screen could be avoided.

SUMMARY OF THE INVENTION

It is therefore one object of the present invention to provide a method of displaying text in its context on a display screen.

It is another object of the present invention to provide a method which maintains eye contact with a fine of text as the display is changed to show the line in its context.

The foregoing objects are achieved as is now described. These disadvantages can be overcome by maintaining the physical position on a display screen of the occurrence of text and displaying the surrounding text above and below the selected occurrence. The display of the surrounding text in this way gives the illusion that the surrounding lines in the file were "filled-in" around the chosen line, such that the eye of the user does not have to move and re-locate the text of interest, since the text has not moved on the screen. Accordingly the invention provides a method of displaying text on a physical display screen, the text comprising a plurality of lines of characters from one or more data files, the method comprising the steps of displaying the plurality of lines on the display screen; selecting one of the displayed lines; displaying the lines preceding the selected line in the data file in a physical position above the selected line; and displaying the lines succeeding the selected line in the data file in a physical position below the selected line; wherein the text of the selected line retains its physical position, both horizontally and vertically, on the physical display screen. Preferably, in order to assist in creating the illusion, the selected line also retains its display attributes, which may include color and/or highlighting.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Cross reference tools are used for searching and for exploring of input data. The input data may be computer program source code written in languages such as COBOL, C or Assembler. It may also be text or tables used in documentation or the like.

In a preferred embodiment of a cross-reference tool, called CRUISE, it has been an aim to provide a high performance tool with an extremely easy to use user interface.

Figure 1:
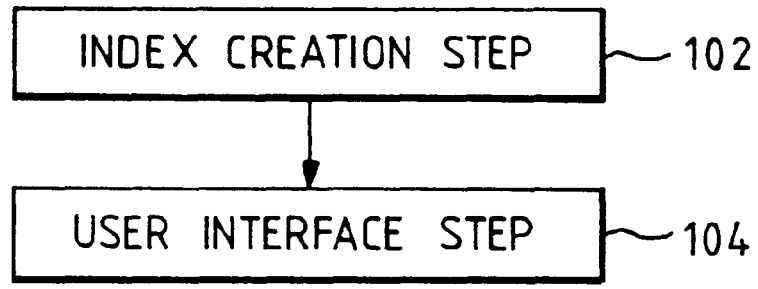
FIG. 1 is a flow diagram of the steps in a preferred embodiment of the invention.

FIG. 1 shows the two main steps in the CRUISE tool. An index creation step 102 builds an intermediate index and a user interface step 104 allows the user to specify to the cross reference tool the operations that the user desires and to display the resulting output on a display screen.

Index Creation Step

The index creation step 102 takes as input the input data and builds an intermediate index of each word in the input data and where each occurrence can be found of the word in the input data. This step 102 is repeated for each input data file that it is desired to be able to cross reference. This process is normally completed during periods when there is spare capacity on the system on which the cross reference program is running. Typically such spare capacity is available overnight. In this way the cost of the index creation step 102 can be reduced.

For each different type of input file that is indexed, a different index creation step 102 is completed to select the words to be indexed. This allows the index creation step 102 to be optimized to exploit the known syntax associated with that particular computer language. Where two languages are similar, or for example for all types of text files, the same index creation may optionally be used.

In order to improve the performance of the user interface step 104, an exclusion list is maintained. There are many words which it is not necessary to index, since a user will not want to cross reference these between files. When the input files are source code, words which are part of the syntax of the language such as "Do" and "End" will not be required to be cross referenced by the user, and so are not normally indexed. When the input files are text data, then common words such as "the" and "and" will not require indexing. A different list is maintained for each one of the various different index creation steps 102 which may be used for different computer languages. Optionally, a list may be shared between the more than one different index creation steps 102. Words which are excluded are counted, so although the occurrences of, for example, "and" in a text file cannot be individually located, the number of occurrences of the word "and" can be determined.

The intermediate index is then compressed to reduce the disk space which it occupies and the index thus created is made available to the users via the user interface step 104. The index data preferably includes the original data records, although in compressed format. The user interface step 104 does not then have to refer to the uncompressed data file. If the index data does not include the original data records, the user interface step 104 does have to refer to the original uncompressed data file.

User Interface Step

Figure 2:
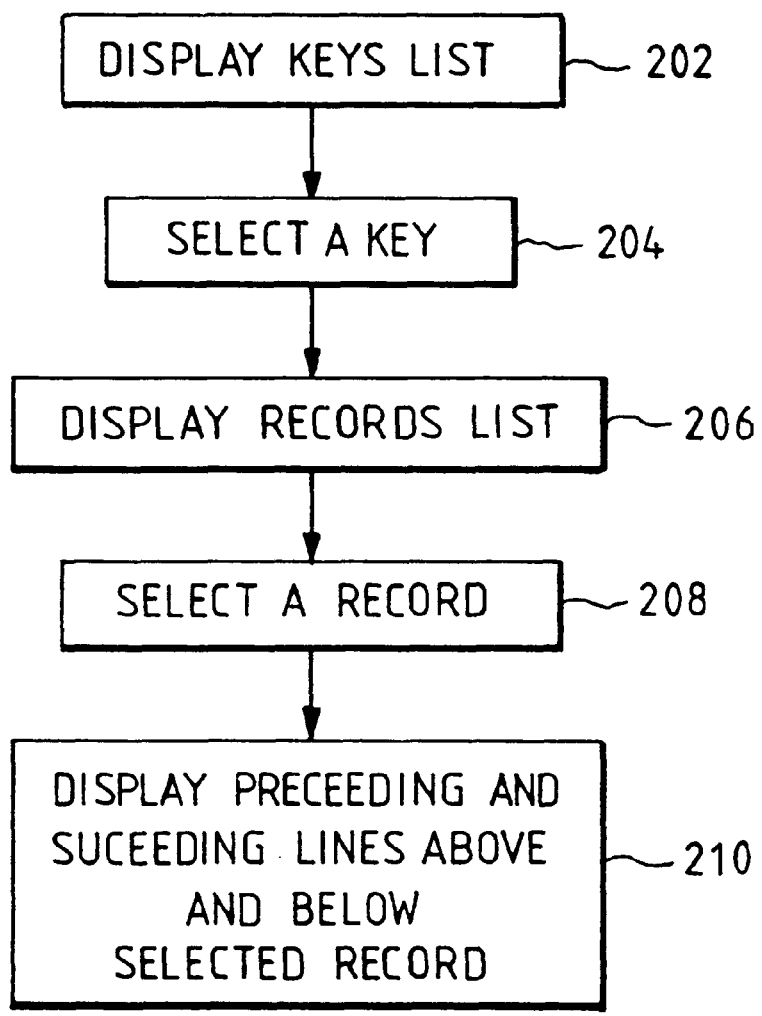
FIG. 2 is a flow diagram of the steps within the User Interface step of FIG. 1.
Figure 3:
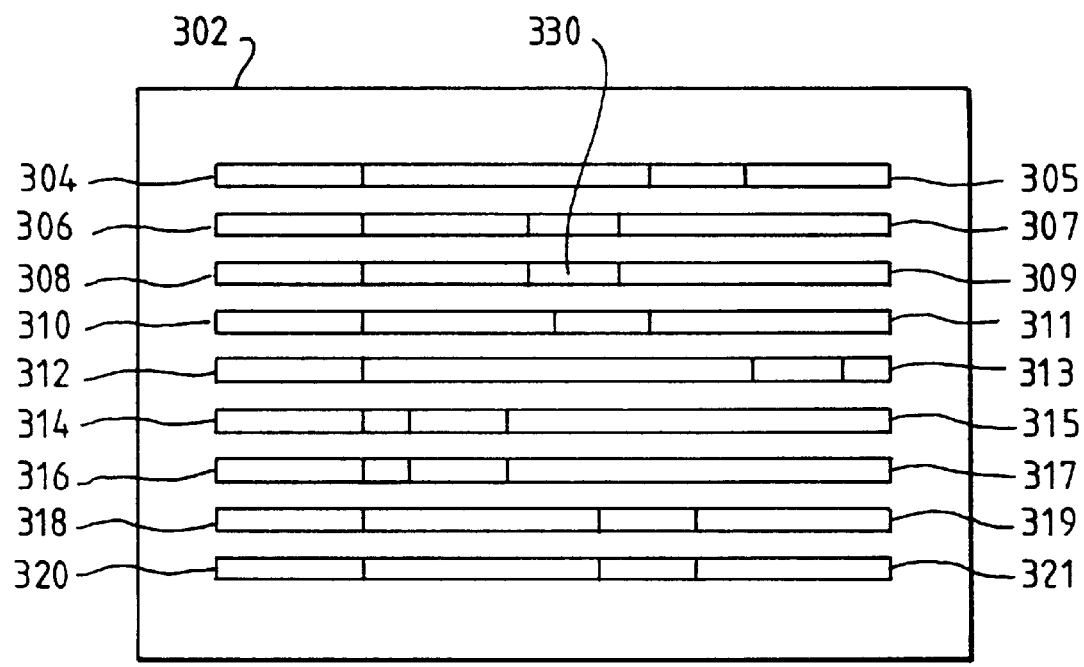
FIG. 3 is the screen seen by the user when the Records List is displayed.
Figure 4:
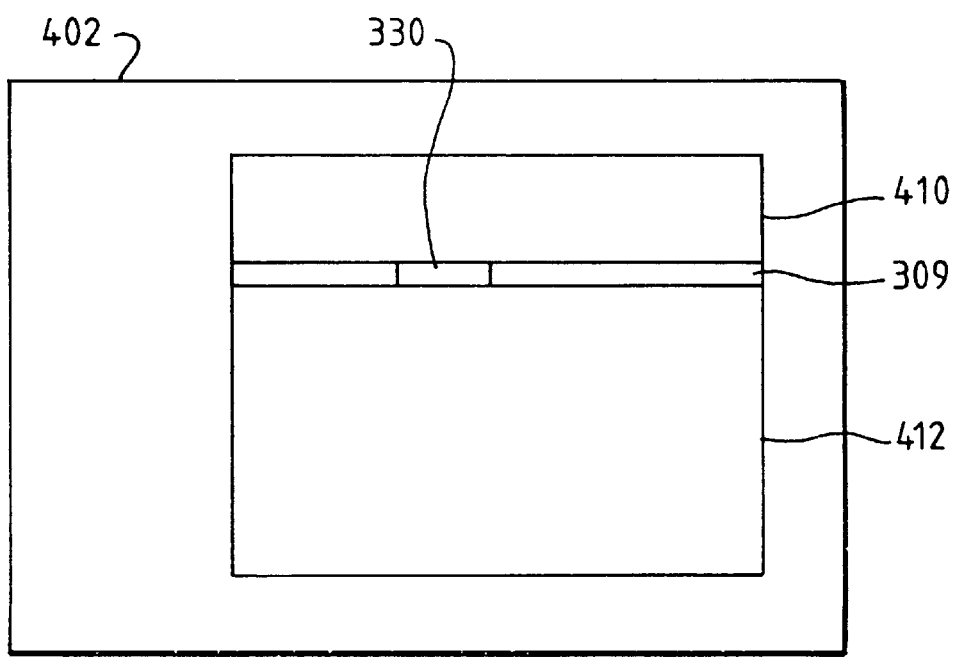
FIG. 4 is the screen seen by the user when the Source Context View is displayed.

In the user interface step 104, the user selects the input files to be searched. Optionally, all of the input data files available to the cross reference tool may be used. The user then selects the word to be searched for. The search is completed and the results displayed. The operation of the above steps are now described by using an example of a typical search for an occurrence of a word which a user might request. FIG. 2 shows the steps within the user interface step.

The simplest request the user may make is to search for all occurrences of a single word. This is accomplished by simply typing the word and pressing the Enter key (or depressing a button on a mouse), or by moving the cursor to that word if it is already displayed and pressing the Enter key (or depressing a button on a mouse). The results of the search are displayed 202 as a list of words found in the index for any of the input data files, which match the word requested by the user. These words are annotated with the number of instances of each. For example, searching for the word FRED might give the following list of occurrences found:

| FRED | 10 | lines in 4 files |
|---|---|---|
| FREDA | 4 | lines in 2 files |
| FREDERICK | 1 | line in file FOOBAR ASSEMBLE |

This is called the Keys List. Any line in the Keys List can be selected 204 to show more detail of the occurrences found. This selection 204 is done by moving the display cursor to the line (using display cursor control keys or by using a mouse) and pressing the Enter key. In the example above, if the display cursor is moved to the line for FREDA, then the following list would be displayed 206:

| ELEPHANT ASSEMBLE | | FREDA EQU 10 | A comment |
|---|---|---|---|
| ELEPHANT ASSEMBLE | L | FREDA, ANOTHER | Some more comment |
| GIRAFFE ASSEMBLE | | MVC FREDA, PANDA | Move the data |
| GIRAFFE ASSEMBLE | | (yet another line containing FREDA) | |

This is called the Records List. The records (305, 307 . . . 319, 321) containing the selected word 330 are displayed on the display screen 302, each record being prefixed by the file name (304, 306 . . . 318, 320) containing that record. The Records List is displayed 206 using certain colors for different elements of the data, for example, the word 330 which caused this record to be indexed is yellow, the rest of the line green.

Next, with the user having established the relevance or otherwise of the data being displayed 206 in the Records List, one of the occurrences in the list can be shown in its context within the file containing that occurrence. One of the occurrences 330 is selected 208 by moving the display cursor to the line 309 on screen 302 containing the occurrence and pressing Enter. The actual file containing the line 309 is then displayed 210 on the screen 410, allowing it to be browsed by the user.

The position ($L_{sourc}$) of the depiction of the selected line 309 in the Record List is determined with respect to the physical screen of the display. The position of the source record corresponding to the selected line 309 is determined as a record number within the file which contains it. The number of lines available ($L_{pre}$) on the display screen above the source record on the screen of the next view 402 is determined, as is the number of lines available ($L_{post}$) on the display screen below the source record. This may be the number of lines available on the remainder of the screen or within which a window may be created. Records corresponding to lines are then read from the physical file starting from the record for line ($L_{sourc}-L_{pre}$) and continuing to the record for line ($L_{sourc}+L_{post}$), that is ($L_{post}+L_{pre}+1$) records in total. The records are then displayed such that the characters in the selected line 309 of the Records List are exactly overlaid by the same characters in the same line in the new view (described below as the Source Context View) of the complete file. The records for lines starting from ($L_{sourc}-L_{pre}$) to ($L_{sourc}-1$) are displayed in the area 410 above the previously selected line 309 and the records for lines starting from ($L_{sourc}+1$) to ($L_{sourc}+L_{pre}+1$) are displayed in the area 412 below the previously selected line 309.

In the above example, if the first entry listed from the file GIRAFFE ASSEMBLE is selected, then the following list would be displayed:

| | (new window border) |
|---|---|
| FREDA | GIRAFFE ASSEMBLE |
| GIRAFFE ASSEMBLE | (a line in the file) |
| GIRAFFE ASSEMBLE | (a line in the file) |
| GIRAFFE ASSEMBLE | MVC FREDA, PANDA  Move the data |
| GIRAFFE ASSEMBLE | (yet another line in the file) |

This is called the Source Context View. The expansion of the data from the Records List to the Source Context View has given the illusion that the other lines in the file were "filled-in" around the chosen line 309, such that the eye of the user (who will have been looking at the line in question at the time) does not have to move and re-locate the text of interest, since the text has not moved on the screen. In addition, the Source Context View uses the same color for all records within it, for example, red, with the exception of the record 309 which was expanded from the previous Records List, which retains its previous coloration, that is, the word 330 which caused this record to be indexed is yellow, the rest of the line green. This is an optional feature and heightens the impression that the record 309 being viewed has not moved. The surrounding records appear to have been suddenly revealed, as if they were present before but hidden from view.

The overall result of the selected record remaining in the same position and displayed in the same colors is to make the expansion from a single displayed line to a view of that line in context as visually seamless as possible.

If the Source Context View of the file is not of interest, hitting the Cancel key (which may be the Escape key, a Program Function key or similar) closes the Source Context View and redisplays the earlier Records List in the position it was previously displayed. Again the eye of the user (who will have been looking at the line in question at the time) does not have to move and re-locate the text of interest, since the text has not moved on the screen.

As an alternative to returning to the Records List view, any other word displayed in the Source Context View may be selected for searching. A new series of views (Keys List, then Records List, then Source Context) are created. This process can continue as many times as the user requires.

Although the specific embodiment described uses a physical display screen on which data is written, the invention may also be applied to a display screen which is emulated, for example, within a window.

While the invention has been particularly shown and described with reference to a preferred embodiment, it will be understood by those skilled in the art that various changes in form and detail may be made therein without departing from the spirit and scope of the invention.

What is claimed is:

1. A method of displaying text on a physical display screen using a key word search, the text comprising a plurality of lines of characters, each line having said key word, from one or more data files, the method comprising the steps of:

(a) displaying the plurality of lines, each line having said key word, on the display screen;
    (b) selecting one of the displayed lines having said key word; and
    (c) displaying selected lines immediately preceding and immediately succeeding the selected line in the same data file in physical position above and below, respectively, the selected line and said key word, wherein the text of the selected line retains its physical position, both horizontally and vertically, on the physical display screen.

2. A method as claimed in claim 1 further including the steps, before said displaying steps (a) and (c), of:

selecting a word for which occurrences are to be searched for in the one or more data files; and
    displaying as the plurality of lines, lines containing occurrences of the selected word.

3. A method as claimed in claim 1 wherein the data files are indexed to allow rapid location of occurrences of the pre-selected word.

4. A method as claimed in claim 1 wherein the selected line also retains its display attributes.

5. A method as claimed in claim 1 wherein the display attributes include the displayed color of the text.

\* \* \* \* \*